(12) United States Patent
Pilkington

(10) Patent No.: US 10,073,464 B2
(45) Date of Patent: Sep. 11, 2018

(54) VARYING THE DISTANCE BETWEEN VEHICLES IN A PLATOON

(71) Applicant: Bendix Commercial Vehicle Systems LLC, Elyria, OH (US)

(72) Inventor: Andrew J. Pilkington, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 27 days.

(21) Appl. No.: 15/395,160

(22) Filed: Dec. 30, 2016

(65) Prior Publication Data

US 2018/0188745 A1   Jul. 5, 2018

(51) Int. Cl.
| | | |
|---|---|---|
| *G05D 1/02* | (2006.01) | |
| *B60W 30/165* | (2012.01) | |
| *G08G 1/00* | (2006.01) | |

(52) U.S. Cl.
CPC ......... *G05D 1/0295* (2013.01); *B60W 30/165* (2013.01); *G05D 1/0276* (2013.01); *G05D 1/0293* (2013.01); *G08G 1/22* (2013.01); *B60W 2300/12* (2013.01); *B60W 2520/12* (2013.01); *G05D 1/0289* (2013.01)

(58) Field of Classification Search
None
See application file for complete search history.

(56) References Cited

U.S. PATENT DOCUMENTS

| | | |
|---|---|---|
| 6,032,097 A | 2/2000 | Iihoshi |
| 6,437,688 B1 | 8/2002 | Kobayashi |

(Continued)

FOREIGN PATENT DOCUMENTS

| | | |
|---|---|---|
| CN | 103395419 B | 2/2016 |
| EP | 2390744 A1 | 11/2011 |

(Continued)

OTHER PUBLICATIONS

Scania Group, Platooning, www.youtube.com/watch?v=X3fF6m4ks1g—Published on Oct. 3, 2013, 2m:12s.

(Continued)

*Primary Examiner* — Jonathan M Dager
*Assistant Examiner* — Garrett F Evans
(74) *Attorney, Agent, or Firm* — Tucker Ellis LLP

(57) ABSTRACT

Inter-vehicle platoon distance management is provided. Parameters relating to external conditions are used together with vehicle physical characteristics, performance information, and other factors to select an optimized distance between vehicle pairs traveling as a platoon. The parameters relating to the external conditions are aggregated by the following vehicle of the platoon vehicle pair, and used to adjust or otherwise modify a predetermined minimum following distance parameter. This allows flexibility in the platooning control to follow at different distances while maintaining an overall fuel economy benefit of the platoon. When no external condition restrictions exist, the platoon vehicles follow at the shortest distance to maximize fuel economy. However, as the aggregated external conditions increase, the platooning distance is extended to improve safety while preserving as much fuel economy benefit of the platoon as possible.

18 Claims, 9 Drawing Sheets

BENDIX CONFIDENTIAL

(56) References Cited

U.S. PATENT DOCUMENTS

| | | | |
|---|---|---|---|
| 9,632,507 B1 * | 4/2017 | Korn | G05D 1/0295 |
| 2010/0256835 A1 | 10/2010 | Mudalige | |
| 2010/0256852 A1 | 10/2010 | Mudalige | |
| 2013/0211624 A1 | 8/2013 | Lind | |
| 2016/0002618 A1 | 1/2016 | Jacobsen et al. | |
| 2016/0054773 A1 | 2/2016 | Gulati | |
| 2017/0249844 A1 * | 8/2017 | Perkins | B60W 50/0097 |

FOREIGN PATENT DOCUMENTS

| | | |
|---|---|---|
| JP | 2015022420 A | 2/2015 |
| JP | 2015022421 A | 2/2015 |
| WO | 20091455552 A2 | 12/2009 |
| WO | 2013147684 A1 | 10/2013 |
| WO | 2014137270 A1 | 9/2014 |
| WO | 2015047174 A1 | 4/2015 |
| WO | 2015047175 A1 | 4/2015 |
| WO | 2015047178 A1 | 4/2015 |
| WO | 2015156731 A1 | 10/2015 |
| WO | 2016065055 A1 | 4/2016 |

OTHER PUBLICATIONS

Valeria Turri, "Fuel-efficient and safe heavy-duty vehicle platooning through look-ahead control", KTH Electrical Engineering, Licentiate Thesis, Stockholm, SE, 2015.

El-Zaher, Madeleine, "Vehicle Platoon Control with Multi-Configuration Ability", Elsevier, Procedia Computer Science 9 (2012)1503-1512.

Man Truck2Truck, European Truck Platooning Challenge 2016, www.youtube.com/watch?v=fHibsfilrhk—Published Apr. 4, 2016, 2m:55s.

Autogefühl, Daimler connected trucks highway pilot for autonomous platoon driving—Mercedes campus connectivity, www.youtube.com/watch?v=hVtd33JEsN0—Published Mar. 23, 2016, 16m:25s.

European Patent Office, International Search Report and Witten Opinion corresponding to PCT/US2017/068789, dated Apr. 12, 2018, pp. 1-12.

* cited by examiner

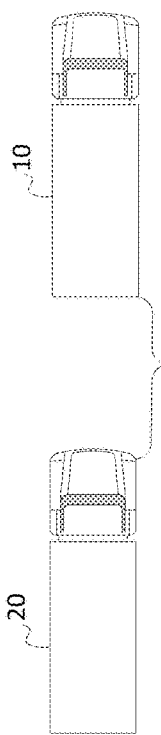
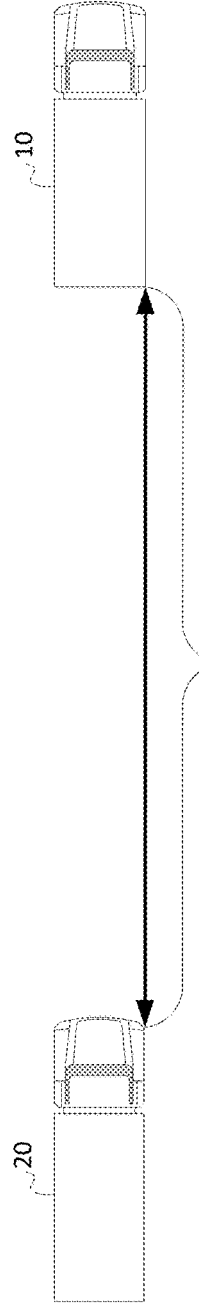
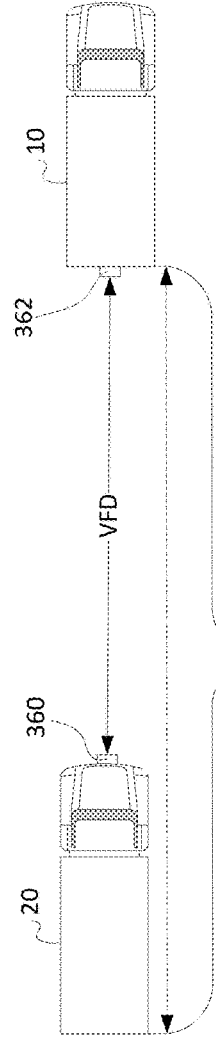

VARYING THE DISTANCE BETWEEN VEHICLES IN A PLATOON

TECHNICAL FIELD

The embodiments herein relate generally to highway vehicle platoon management. More specifically, particular embodiments relate to inter-vehicle platoon distance management wherein parameters relating to environmental platoon conditions are aggregated by the vehicles of the platoon, and are used to adjust or otherwise modify a predetermined minimum following distance or spacing parameter for purposes of maximizing safety while still providing improved fuel savings and other efficiency benefits afforded by platoon participation. Although the invention will be described with reference to these particular example embodiments, it is to be appreciated that the claimed invention is also amenable to other applications.

CROSS REFERENCE TO RELATED APPLICATIONS

This application is related to U.S. application Ser. No. 15/395,219, filed Dec. 30, 2016, entitled: SELF-ORDERING OF FLEET VEHICLES IN A PLATOON; U.S. application Ser. No. 15/395,251, filed Dec. 30, 2016, entitled: DETECTION OF EXTRA-PLATOON VEHICLE INTERMEDIATE OR ADJACENT TO PLATOON MEMBER VEHICLES; and U.S. application Ser. No. 15/395,214, filed Dec. 30, 2016, entitled: "V" SHAPED AND WIDE PLATOON FORMATIONS, the contents of each of these applications being incorporated herein by reference in their entirety.

BACKGROUND

It is known that two or more vehicles moving along a roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane. More complicated platoons can span two or more roadway lanes but, overall, the goals of providing enhanced efficiency but more importantly safety to both the platooned vehicles as well as to the other non-platooning vehicles on the roadway most usually dictate the single lane platoon incarnation.

The aerodynamic geometry of the vehicles within a platoon is a significant factor used in determining an ordering of the vehicles. As a general rule, a physically smaller vehicle following a physically larger vehicle will provide a greater benefit. Since commercial box trucks and tractors towing box trailers are in general taller and wider than most flatbed tractor trailer combinations, a maximum aerodynamic benefit and resultant fuel savings is realized by ordering vehicles classified this way such that the commercial box truck and tractors towing box trailers take the leader position(s) in the platoon, while the flatbed tractor trailer rigs take the follower position(s) in the platoon.

In addition to the above, maintaining a small distance or spacing between platooned vehicles gives greater benefit in terms of reduced energy consumption. However, holding a tight distance or spacing between platooned vehicles requires that careful attention be paid to various functional or environmental and operational characteristics and capabilities of the vehicles and other external conditions including the overall size of the platoon, weather conditions, relative braking abilities between vehicle pairs, relative acceleration abilities, relative load or cargo size and weight including required stopping distance, and the like. Special attention must also be paid to characteristics of the roadway such as roadway incline, decline, and turn radii. These various parameters implicate directly or indirectly the inter-vehicle safety considerations as well as the overall safety of multiple vehicle platoons.

Although many commercial vehicles that participate in platoons are highly sophisticated and are equipped with adaptive cruise control (ACC) systems used for maintaining a safe relative distance between a host vehicle and a forward vehicle, and collision mitigation (CM) systems for avoiding or lessening the severity of impacts between a host and a forward vehicle using various combinations of transmission, vehicle retarder, and foundation brake controls, the vehicles are not completely autonomous. More particularly, humans drive commercial vehicles in platoons and current ACC and CM systems do not provide for inter-vehicle platoon distance and/or spacing management between platoon vehicle pairs.

One SAE standard is J2945 directed in general to Dedicated Short Range Communication (DSRC), and a work in process portion of that standard is J2945/6 is directed to performance requirements for cooperative ACC and platooning. J2945/6 is intended to define the data exchange that will be necessary for coordinated maneuvers, and that definition of the categories should start with differentiating between platooning and ACC, then determining message sets and performance to realize cooperative vehicles. However, J2945/6 also does not provide for inter-vehicle platoon distance management between platoon vehicle pairs.

Given the above, it will be helpful to use selected parameters relating to external conditions together with vehicle physical characteristics, performance information, and other factors to select an optimized minimum distance or spacing between vehicle pairs traveling as a platoon. It would be helpful for a following vehicle of the platoon vehicle pair to aggregate the parameters relating to the external or environmental conditions, and to use the aggregated and processed parameters to adjust or otherwise modify a predetermined minimum following distance or spacing parameter. This would allow enhanced flexibility in the platooning control to follow at different distances providing for maximized safety while yet maintaining an overall fuel economy benefit of the platoon.

The present embodiments provide for new and improved control of variable distances or spacing between vehicles in a platoon.

SUMMARY OF THE EXAMPLE EMBODIMENTS

The embodiments permit two or more vehicles moving along a roadway to cooperate as a road train or a "platoon" for providing mutual safety and efficiency benefits.

In accordance with one aspect, inter-vehicle platoon distance management is provided. The inter-vehicle platoon distance management allows flexibility in the platooning control to follow at different distances while maintaining an overall fuel economy benefit of the platoon.

In accordance with another aspect, parameters relating to external conditions such as environmental conditions for example are used together with vehicle physical characteristics, performance information, and other factors to select an optimized minimum distance between vehicle pairs traveling as a platoon. The parameters relating to the external conditions are aggregated in the example embodiment by the following vehicle of a platoon vehicle pair.

In accordance with another aspect, the parameters relating to the external conditions are processed by the following vehicle of a platooned vehicle pair for calculating a platoon spacing factor or parameter.

In accordance with another aspect, the following vehicle of a platooned vehicle pair uses the platoon spacing factor or parameter to adjust or otherwise modify a predetermined minimum following distance parameter, thereby determining a variable inter-vehicle platoon distance optimized to the particular vehicle pair and optimized to the parameters relating to external conditions of the particular vehicle pair.

In accordance with yet another aspect, flexibility in the platooning control to follow at different distances while maintaining an overall fuel economy benefit of the platoon is provided. When no external condition restrictions exist, the platoon vehicles follow at the shortest distance or spacing as set or otherwise determined by the predetermined minimum following distance parameter to maximize fuel economy. However, as the aggregated external conditions increase, the platooning distance is extended by increasing the predetermined minimum following distance parameter, thereby improving overall safety of the platooned vehicle pair while preserving as much fuel economy benefit of the platoon as possible. In an example, a typical minimum following spacing for optimized fuel savings is about 0.4 seconds (sec.) or, equivalently, a typical minimum following distance is about 38 feet (ft.) at 65 miles per hour (MPH) for optimized fuel savings. Increasing the following spacing to about 0.8 sec. or, equivalently, the following distance to about 76 feet at 65 MPH eliminates substantially any fuel savings benefit to the lead vehicle of the platoon. Increasing the following spacing further to about 2 sec. or, equivalently, the following distance to about 190 feet at 65 MPH substantially eliminates any fuel savings benefit to both vehicles of a two-vehicle platoon.

In accordance with yet another aspect, an inter-vehicle following distance of a platooned vehicle pair is increased in accordance with a first condition one or more parameters relating to external conditions of the platooned vehicle pair.

In accordance with yet a further aspect, an inter-vehicle following distance of a platooned vehicle pair is decreased in accordance with a second condition one or more parameters relating to external conditions of the platooned vehicle pair.

In accordance with yet another further aspect, a variable inter-vehicle following distance of a platooned vehicle pair is controlled or otherwise set in accordance with a varying condition of one or more parameters relating to external conditions of the platooned vehicle pair.

Other embodiments, features and advantages of the example embodiments will become apparent from the following description of the embodiments, taken together with the accompanying drawings, which illustrate, by way of example, the principles of the example embodiments.

BRIEF DESCRIPTION OF THE SEVERAL VIEWS OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIGS. 2a-2c depict a sequence of operations for inter-vehicle platoon distance and/or spacing management in accordance with an embodiment.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments will be utilized to practice the present invention and structural and functional changes will be made thereto without departing from the scope of the present invention.

In the following description of the present invention reference is made to the accompanying figures which form a part thereof, and in which is shown, by way of illustration, exemplary embodiments illustrating the principles of the present invention and how it is practiced. Other embodiments will be utilized to practice the present invention and structural and functional changes will be made thereto without departing from the scope of the present invention.

Figure 1:
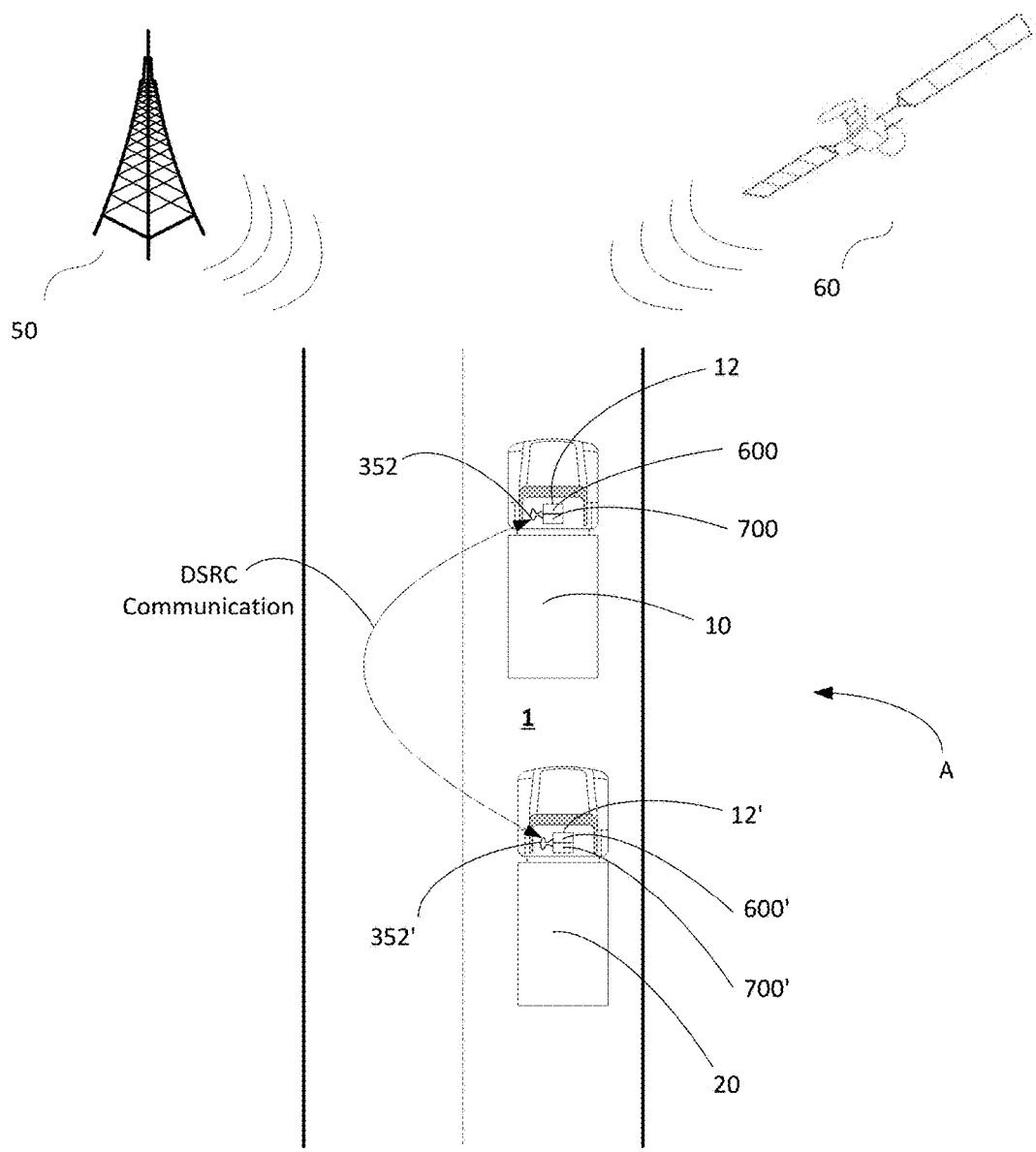
FIG. 1 depicts operation of an exemplary platoon in accordance with an embodiment.

Referring now to the drawings, wherein the showings are for the purpose of illustrating the example embodiments only, and not for purposes of limiting the same, FIG. 1 illustrates a basic platoon A including a host or leader vehicle 10 in traffic with a second or follower vehicle 20 in accordance with the present disclosure. As shown, the follower vehicle 20 is traveling proximate to the leader vehicle 10 in an ordered platoon A along a roadway 1. The follower vehicle 20 is provided with an electronic control system 12 which includes a data collection and communication module portion 300 and a platooning control portion 400 to be described in greater detail below. Similarly, the leader vehicle 10 is also provided with an equivalent electronic control system 12' which includes an equivalent data collection and communication module portion 600' and an equivalent platooning portion 700'. In the example embodiments to be described herein, although each of the two or more vehicles comprising the various platoons that will be described include the same or equivalent electronic control system 12, the same or equivalent data collection and communication module portion 600, and the same or equivalent platooning control portion 700, other disparate control systems having the functionality to be described herein may equivalently be used as necessary or desired.

In the example embodiment illustrated, the electronic control systems 12, 12' of the respective vehicles 20, 10 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to inter-vehicle platoon distance and/or spacing management i.e. platoon ordering and spacing beneficially without the need to consult with or act under the direction of or in concert with the remote wireless communication system 50, the remote satellite system 60, the remote fleet management facility, Central Command Center (CCC), a Network Operations Center (NOC), or the like.

In addition to the above, the electronic control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon A can communicate with each other locally for self-ordering and spacing into a platoon without the need for input from the CCC in accordance with the embodiments herein. The vehicles forming the basic platoon A can also communicate with one or more other vehicles locally without the need for input from the CCC for negotiating the one or more other vehicles into the platoon in accordance with the embodiments herein. The vehicles forming the basic platoon A can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are Platoon capable and the driver has indicated, via a switch or user interface, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

FIGS. 2a-2d illustrate a platoon vehicle pair 200 comprising the leader and follower vehicles described above in connection with FIG. 1. A minimum following distance NNN is depicted first in FIG. 2a, wherein the following vehicle 20 follows the leader vehicle 10 maintaining or otherwise keeping a minimum possible following distance NNN between the leader vehicle 10 and itself 20. The minimum following distance NNN may be stored in a memory of an inter-vehicle platoon distance and/or spacing management computer system in a manner to be described below. In an example, a typical minimum following spacing for optimized fuel savings is about 0.4 seconds (sec.) or, equivalently, a typical minimum following distance NNN is about 38 feet (ft.) at 65 miles per hour (MPH) for optimized fuel savings. The follower vehicle may be equipped, for example, with a forward radar integrated with its on-board (ACC) system and/or collision mitigation (CM) system.

It is to be appreciated that the minimum following distance NNN realizes the maximum fuel benefit to the platoon vehicle pair 200. However, owing to the close proximity between the vehicles and given that they are potentially travelling a high rate of speed while platooning as shown, it is important that the distance between the vehicles does not exceed the capabilities of the vehicles to be able to react in order avoid accidents such as might be caused by changes in one or more variables external to the vehicles proper. Therefore, although the platoon gap arrangement shown in FIG. 2a is the most fuel efficient, it is also the gap arrangement most sensitive to safety concerns arising from the changes that might occur in one or more the environmental variables external to the vehicles.

An arrangement of the platoon pair 200 which is significantly less sensitive to safety concerns arising from the changes that might occur in one or more the environmental variables external to the vehicles is shown in FIG. 2b. As depicted, the following vehicle 20 follows the leader vehicle 10 maintaining or otherwise keeping a maximum possible following distance MMM between the leader vehicle and itself. As mentioned above, increasing the following spacing to about 2 sec. or, equivalently, the following distance MMM to about 190 feet at 65 MPH substantially eliminates any fuel savings benefit to both vehicles of a two-vehicle platoon thereby effectively setting the maximum possible following distance MMM between the leader and follower vehicles. Similar to the minimum following distance NNN, the maximum possible following distance MMM between the leader and follower vehicles may be stored in the memory of the inter-vehicle platoon distance and/or spacing management computer system as well.

It is to be appreciated that the maximum following distance MMM realizes a substantially degradation or loss of fuel benefit to the platoon vehicle pair 200 relative to the fuel benefit that is realized in the arrangement of FIG. 2a. However, owing to the substantial spacing between the vehicles and even given that they are potentially travelling a high rate of speed while platooning as shown, the maximum following distance MMM ensures that the capabilities of the vehicles to be able to react in order avoid accidents based on following distance such as might be caused by changes in one or more variables external to the vehicles is not exceeded. Therefore, the platoon arrangement shown in FIG. 2b is the least fuel efficient, but it is also the arrangement least sensitive to safety concerns arising from the changes that might occur in one or more the variables external to the vehicles.

In addition to the above, it can be said that the platoon arrangement shown in FIG. 2b is, effectively, not a platoon at all but rather just an arrangement of a set of vehicles independently travelling together along the roadway 1. In this case, the maximum following distance MMM may be used to establish a threshold for selectively initiating the generation and transmission of a signal between the vehicles 10, 20 to discontinue the platoon coordination protocol until such time as the vehicles can move closer to thereby effect the benefits deriving from platooning. Alternatively, any other following distance multiple of the minimum following distance X×NNN may be used as necessary and/or desired to establish the threshold for selectively initiating the generation and transmission of the signal between the vehicles 10, 20 to discontinue the platoon coordination protocol until such time as the vehicles can move closer to thereby effect the benefits deriving from platooning. As an example, a following distance of 5×NNN may be used to establish the threshold for selectively initiating the generation and transmission of the signal between the vehicles 10, 20 to discontinue the platoon coordination protocol until such time as the vehicles can move closer to thereby effect the benefits deriving from platooning.

In accordance with the example embodiments herein, an inter-vehicle platoon distance/spacing management method is provided for maximizing fuel savings of the platoon vehicle pair 200 without compromising safety. In particular, the platoon distance/spacing management method uses parameters relating to external factors such as environmental conditions together with vehicle physical characteristics, performance information, and other factors to select an optimized and variable distance WV between the vehicles 10, 20 traveling as a platoon 200. The parameters relating to the external conditions are aggregated by the following vehicle 20 of the platoon vehicle pair 200, and are used to adjust or otherwise modify a predetermined minimum following distance parameter NNN. This allows flexibility in the platooning control to follow at different distances while maintaining an overall fuel economy benefit of the platoon. When no external condition restrictions exist, the platoon vehicles 10, 20 follow at the shortest distance NNN to maximize fuel economy. However, as the aggregated external conditions increase, the variable platooning distance VVV is extended up to the maximum platooning distance MMM to improve safety while preserving as much fuel economy benefit of the platoon as possible.

In accordance with the example embodiment, the platoon inter-vehicle gap management system resolves the platoon following distance external platoon conditions or restrictions to derive a factor for modifying or otherwise adjusting the predetermined minimum following distance parameter NNN. More particularly, in the example embodiment, a Platoon_Spacing_Factor is determined as representative of the collective effect of the external or environmental conditions that are to be taken into account for effecting a safe platoon while still maximizing fuel savings benefits. By way of example, the external conditions may include information on whether there are any one or more lead vehicles ahead of the leader vehicle 10. Another external condition may include whether the vehicles 10, 20 have equal brake capability. Another external condition may include whether there is an equal load distribution between vehicles. Another external condition may include whether either vehicle has experienced any ABS/ESP activity for a predetermined time. Another external condition may include the length of time either vehicle has been previously platooning. Another external condition may include the overall size of the platoon other than the leader and follower vehicles 10, 20 and/or the number of other traffic participants in general near the platoon A. Another external condition may include weather information such as may be evidenced by windshield wiper activity. Another external condition may include whether there are any Regional Restrictions on following distances.

In the example embodiment, the Platoon_Spacing_Factor is a unitless number having a value from one (1) to about ten (10) and is, in effect, representative of a ratio between 1:1 to 1:10 representative of the collective effect of the external or environmental conditions that are to be taken into account for effecting a safe platoon while still maximizing fuel savings benefits. The Platoon_Spacing_Factor represents a ratio of 1:1 when no modification is necessary to the minimum following distance NNN. Conversely, the Platoon_Spacing_Factor represents a ratio of 10:1 when full modification is necessary to the minimum following distance NNN. In accordance with the example embodiment, it is desirable to generate a signal effectively disabling the platooning when the ratio reaches a predetermined value of about five (5). At that spacing, the platoon behavior provides little or no effective fuel savings benefit.

It is to be further appreciated that, in the example embodiment, each assessment and/or re-assessment of the Platoon_Spacing_Factor and resultant determination of the variable platooning distance WV can have no effect or full effect on the final platooning distance.

In accordance with the example embodiment, the platoon distance management system resolves the platoon following distance to be the minimum following distance NNN when there are no observed restrictions relating to the external conditions. By way of example, the platoon following distance is resolved to be the minimum following distance NNN when the external conditions indicate that there are no lead vehicles ahead of the leader vehicle 10, that the vehicles 10, 20 have equal brake capability, that there is an equal load distribution between the vehicles, that neither vehicle has experienced any ABS/ESP activity for a predetermined time, that neither vehicle has been platooning much recently, that there are few other traffic participants, that there is no evidence of inclement weather or wiper activity, and that there are no restrictions on following distance imposed by Regional Restrictions.

On the other hand and in accordance with the example embodiment, the platoon distance management system resolves the platoon following distance to be the maximum following distance MMM when a set of restrictions relating to the external conditions are observed. By way of example, the platoon following distance is resolved to be the maximum following distance MMM when the external conditions indicate that there are one or more lead vehicles ahead of the leader vehicle 10, that the vehicles 10, 20 have unequal brake capability, that there is an unequal load distribution between the vehicles, that one or both of the vehicle has experienced any ABS/ESP activity for a predetermined time, that one or both vehicles have been platooning much recently, that there are many other traffic participants, that there is evidence of inclement weather or wiper activity, and that there are one or more restrictions on following distance imposed by Regional Restrictions. As shown in the example of FIG. 2b, the minimum following distance NNN of FIG. 2a is adjusted or otherwise modified in FIG. 2b by an adjustment factor of about ten (10). That is: MMM=NNN*(Platoon_Spacing_Factor)=NNN*10.

FIG. 2c depicts the follower vehicle 20 platooning with the leader vehicle 10 and following behind the leader vehicle by a variable following (platooning) distance VFD as determined by the distance management system in accordance with an embodiment. In accordance with the example embodiment, the platoon distance management system resolves the platoon following distance or gap to be a variable following distance VFD when there are some observed restrictions relating to the external conditions. More particularly, in the example embodiment, the platoon following distance is resolved to be the variable following (platooning) distance VFD when some, but not all, of the restrictions relating to the external conditions are observed, wherein the restrictions may include: the presence of one or more lead vehicles ahead of the leader vehicle 10; an unequal brake capability between the vehicles 10, 20; an unequal load distribution between the vehicles; one or both of the vehicles having experienced recent ABS/ESP activity during a predetermined time; recent platooning activity of one or both vehicles; a large number of other traffic participants; evidence of inclement weather or wiper activity; restrictions on following distance imposed by Regional Restrictions; and the like. As shown in the example of FIG. 2c, the minimum following distance NNN of FIG. 2a is modified in FIG. 2c by a further adjustment factor of about five (5). That is: VFD=NNN*(Platoon_Spacing_Factor)=NNN*5.

It is to be appreciated that, in general, the logic performing the inter-vehicle platoon distance/spacing management method of the example embodiment allows more than merely multiples of the minimum platooning distance NNN. That is, the resulting variable following (platooning) distance VFD may be any distance between the minimum platooning distance NNN and maximum MMM based on the current environmental conditions. As an example, if no environmental conditions exist, then the platooning distance is set to be the minimum platooning distance: VFD=NNN*1.

As an example, in response to other traffic later being detected, the platooning distance may be adjusted or otherwise modified as minimum platooning distance (NNN) *Platooning_Spacing_Factor. Again, in the example embodiment, the range of the platooning spacing factor is typically between 1-10:1 when no modification is necessary and 10 when full modification is necessary. It is desirable to disable platooning when the adjustment or modification to the minimum distance NNN extends beyond a predetermined selected modification such as, for example, beyond five (5) since the platoon no longer provides any fuel savings benefit for vehicles separated by such gap.

Figure 3:
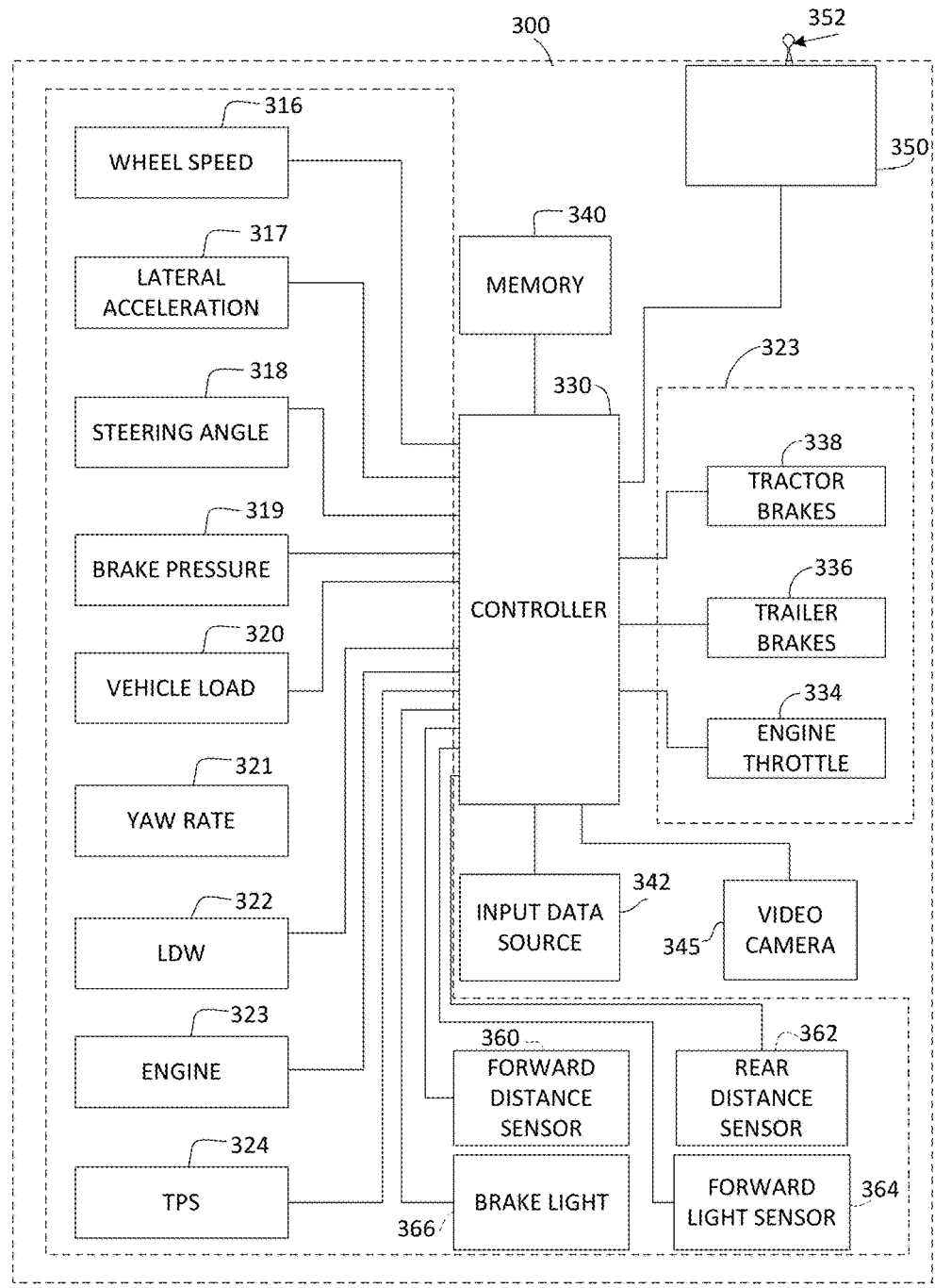
FIG. 3 is a schematic illustration of an exemplary embodiment of a data collection and communication module portion of the subject fleet management system according to the example embodiment.

With reference next to FIG. 3, a schematic representation of a data collection and communication module portion 300 according to principles of the example embodiment is illustrated. The data collection and communication module 300 may be adapted to detect, monitor, and report a variety of operational parameters and conditions of the commercial vehicle and the driver's interaction therewith, and to selectively intervene and take corrective action as may be needed or desired such as, for example, to maintain vehicle stability or to maintain the vehicle following distance relative to other vehicles within a platoon. In the exemplary embodiment of FIG. 3, the data collection and communication module 300 may include one or more devices or systems 314 for providing input data indicative of one or more operating parameters or one or more conditions of a commercial vehicle. For example, the devices 314 may be one or more sensors, such as but not limited to, one or more wheel speed sensors 316, a lateral acceleration sensor 317, a steering angle sensor 318, a brake pressure sensor 319, a vehicle load sensor 320, a yaw rate sensor 321, a lane departure warning (LDW) sensor or system 322, one or more engine condition sensors 323, and a tire pressure (TPMS) monitoring system 324. The data collection and communication module 300 may also utilize additional devices or sensors not described in the exemplary embodiment, or combine one or more devices or sensors into a single unit.

The data collection and communication module 300 may also include a logic applying arrangement 330, such as a controller or processor, in communication with the one or more devices or systems 314. The controller 330 may include one or more inputs for receiving input data from the devices or systems 314. The controller 330 may be adapted to process the input data and compare the raw or processed input data to a stored threshold value. The controller 330 may also include one or more outputs for delivering a control signal to one or more vehicle systems 332 based on the comparison. The control signal may instruct the systems 332 to intervene in the operation of the vehicle to initiate corrective action, and then report this corrective action to a wireless service (not shown) or simply store the data locally to be used for determining a driver quality. For example, the controller 330 may generate and send the control signal to an engine electronic control unit or an actuating device to reduce the engine throttle 334 and slowing the vehicle down. Further, the controller 330 may send the control signal to a vehicle brake system to selectively engage the brakes. In a tractor-trailer arrangement, the controller 330 may engage the brakes on one or more wheels of a trailer portion of the vehicle 336 and the brakes on one or more wheels of a tractor portion of the vehicle 338, and then report this corrective action to the wireless service or simply store the data locally to be used for determining a driver quality. A variety of corrective actions may be possible and multiple corrective actions may be initiated at the same time.

The controller 330 may also include a memory portion 340 for storing predetermined values of the minimum and maximum NNN, MMM following distances. The controller 330 may also use the memory portion 340 for storing and accessing system information, such as for example the system control logic and control tuning. The memory portion 340, however, may be separate from the controller 330. The sensors 314 and controller 330 may be part of a preexisting system or use components of a preexisting system. For example, the Bendix® ABS-6™ Advanced Antilock Brake Controller with ESP® Stability System available from Bendix® Commercial Vehicle Systems LLC may be installed on the vehicle. The Bendix® ESP® system may utilize some or all of the sensors described in FIG. 3. The logic component of the Bendix® ESP® system resides on the vehicle's antilock brake system electronic control unit, which may be used for the controller 330 of the present invention. Therefore, many of the components to support the data collection and communication module 300 of the present invention may be present in a vehicle equipped with the Bendix® ESP® system, thus, not requiring the installation of additional components. The data collection and communication module 300, however, may utilize independently installed components if desired.

The data collection and communication module 300 may also include a source of input data 342 indicative of a configuration/condition of a commercial vehicle. The controller 330 may sense or estimate the configuration/condition of the vehicle based on the input data, and may select a control tuning mode or sensitivity based on the vehicle configuration/condition. The controller 330 may compare the operational data received from the sensors or systems 314 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 342 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 300 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 330 is operatively coupled with one or more video image capture devices shown in the example embodiment as a single video camera 345 representation of one or more physical video cameras disposed on the vehicle such as, for example, one video camera on each corner of the vehicle.

Still yet further, the data collection and communication module 310 may also include a transmitter module 350 such as, for example, a radio frequency (RF) transmitter including one or more antennas 352 for wireless communication of the one or more various vehicle configuration and/or condition data to one or more destinations such as, for example, to one or more wireless services 50, 60 (FIG. 1) having a corresponding receiver and antenna. The controller 330 is operative to communicate the acquired data to the one or more receivers in a raw data form, that is without processing the data, in a processed form such as in a compressed form, in an encrypted form or both as may be necessary or desired. In this regard, the controller 330 may combine selected ones of the vehicle parameter data values into processed data representative of higher level vehicle condition data such as, for example, data from the lateral acceleration sensor 318 may be combined with the data from the steering angle sensor 320 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

Figure 4:
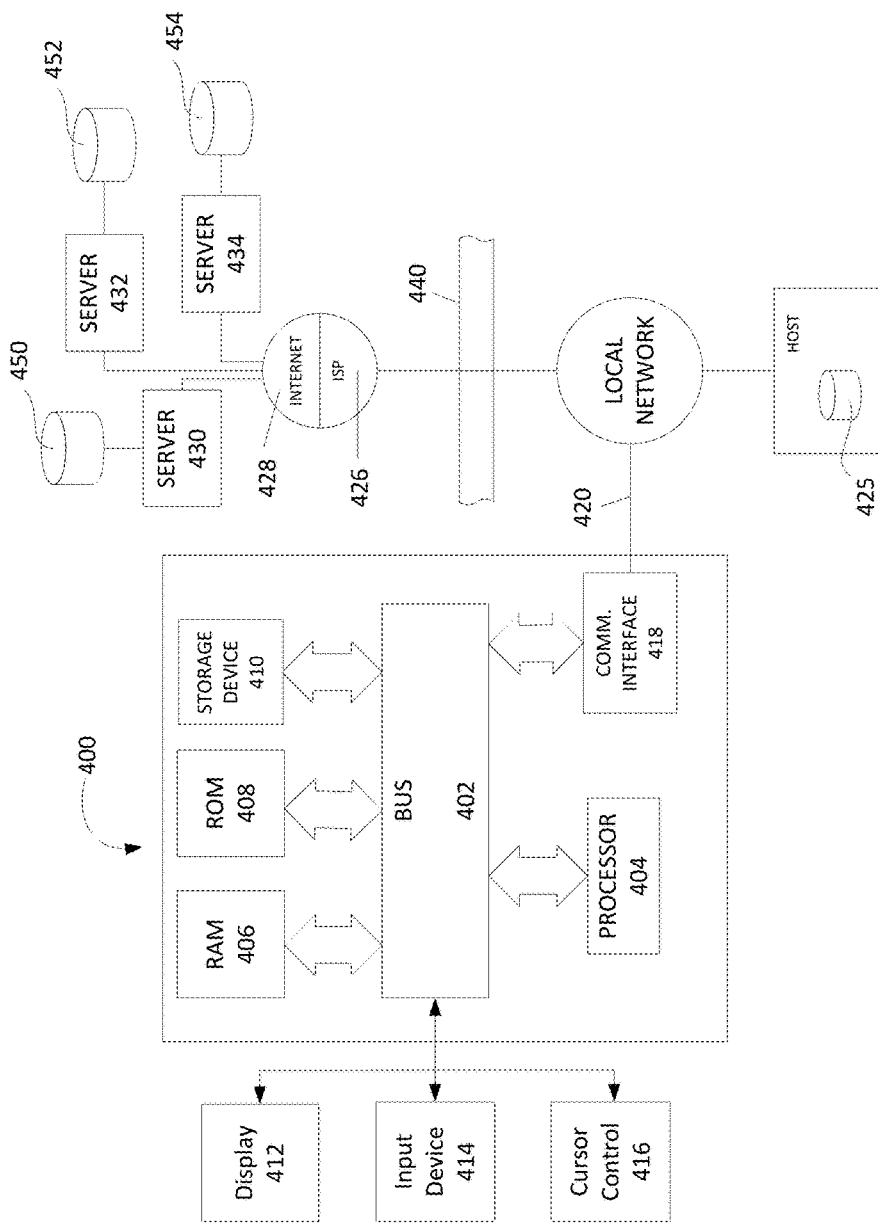
FIG. 4 is a block diagram that illustrates a platoon inter-vehicle distance and/or spacing management computer system suitable for executing embodiments of one or more software systems or modules that perform fleet management and methods of inter-vehicle platoon distance management according to the example embodiment.

FIG. 4 is a block diagram that illustrates an inter-vehicle platoon distance management computer system 400 suitable for executing embodiments of one or more software systems or modules that perform the fleet inter-vehicle platoon management and reporting analyses according to the subject application. The example system includes a bus 402 or other communication mechanism for communicating information, and a processor 404 coupled with the bus for processing information. The computer system includes a main memory, such as random access memory (RAM) 406 or other dynamic storage device for storing information and instructions to be executed by the processor 404, and read only memory (ROM) 408 or other static storage device for storing static information and instructions for the processor 404. A storage device 410 is also suitably provided for storing instructions for execution by the processor, and other information including for example the predetermined values of the minimum and maximum NNN, MMM following distances.

The example embodiments described herein are related to the use of the computer system 400 for accessing, aggregating, manipulating and displaying information from multiple remote resources such as, for example, indirectly from multiple fleet vehicles 10, 20 and directly from multiple wireless services 50, 60. Further, the embodiments described herein are related to the use of computer system 400 for accessing information from the multiple sources in selective combination with internal proprietary data such as driver sensitive data, sales, costs, expense records, travel data, and the like from within a firewall 440. According to one implementation, information from the multiple remote public, commercial, and/or internal proprietary resources is provided by computer system 400 in response to the processor 404 executing one or more sequences of one or more instructions contained in main memory 406. Such instructions may be read into main memory 406 from another computer-readable medium, such as storage device 410. Execution of the sequences of instructions contained in main memory 406 causes the processor 404 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 404 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The inter-vehicle platoon distance management computer system 400 includes a communication interface 418 coupled to the bus 402 which provides a two-way data communication coupling to a network link 420 that is connected to local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 supporting a database 425 storing internal proprietary data and/or to data equipment operated by an Internet Service Provider (ISP) 426. ISP 426 in turn provides data communication services through the Internet 428. Local network 422 and Internet 428 both use electric, electromagnetic or optical signals that carry digital data streams. The signals through the various networks and the signals on network link 420 and through communication interface 418, which carry the digital data to and from the inter-vehicle platoon distance management computer system 400, are exemplary forms of carrier waves transporting the information.

The inter-vehicle platoon distance management computer system 400 can send messages and receive data, including program code, through the network(s), network link 420 and communication interface 418. In the Internet-connected example embodiment, the platoon inter-vehicle platoon distance and/or spacing management computer system 400 is operatively connected with a plurality of external public, private, governmental or commercial servers (not shown) as one or more wireless services 50, 60 configured to execute a web application in accordance with the example embodiment to be described below in greater detail. In the example embodiment shown, the first server 430 is coupled with a database 450 storing selected data received by a first wireless service such as for example data from a first telematics supplier, the second first server 432 is coupled with a database 452 storing selected data received by a second wireless service such as for example data from a second telematics supplier, and the third server 434 is coupled with a database 454 storing selected proprietary data and executable code for performing the web application. The inter-vehicle platoon distance management computer system 400 is operative to selectively transmit a request for data to be selectively retrieved from the respective databases 450, 452, 454 through Internet 428, ISP 426, local network 422 and communication interface 418 or to receive selected data pushed from the databases 450, 452, 454, or by both means in accordance with the example embodiments. The received data is processed executed by the processor 404 as it is received, and/or stored in storage device 410, or other non-volatile storage for later processing or data manipulation.

Although the inter-vehicle platoon distance management computer system 400 is shown in FIG. 4 as being connectable to a set of three (3) servers, 430, 432, and 434, those skilled in the art will recognize that the inter-vehicle platoon distance management computer system 400 may establish connections to multiple additional servers on Internet 428. Each such server in the example embodiments includes HTTP-based Internet applications, which may provide information to the inter-vehicle platoon distance management computer system 400 upon request in a manner consistent with the present embodiments.

Selectively locating the proprietary commercial data in database 425 within the firewall 440 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The inter-vehicle platoon distance management computer system 400 suitably includes several subsystems or modules to perform the platoon inter-vehicle platoon distance and/or spacing management as set forth herein. A primary purpose of the subject application is to provide an improved intuitive and convenient user interface which allows a user to select parameters for performing platoon inter-vehicle platoon distance and/or spacing management, and to make adjustments of the parameters based on the result presentation as necessary or desired.

Figure 5:
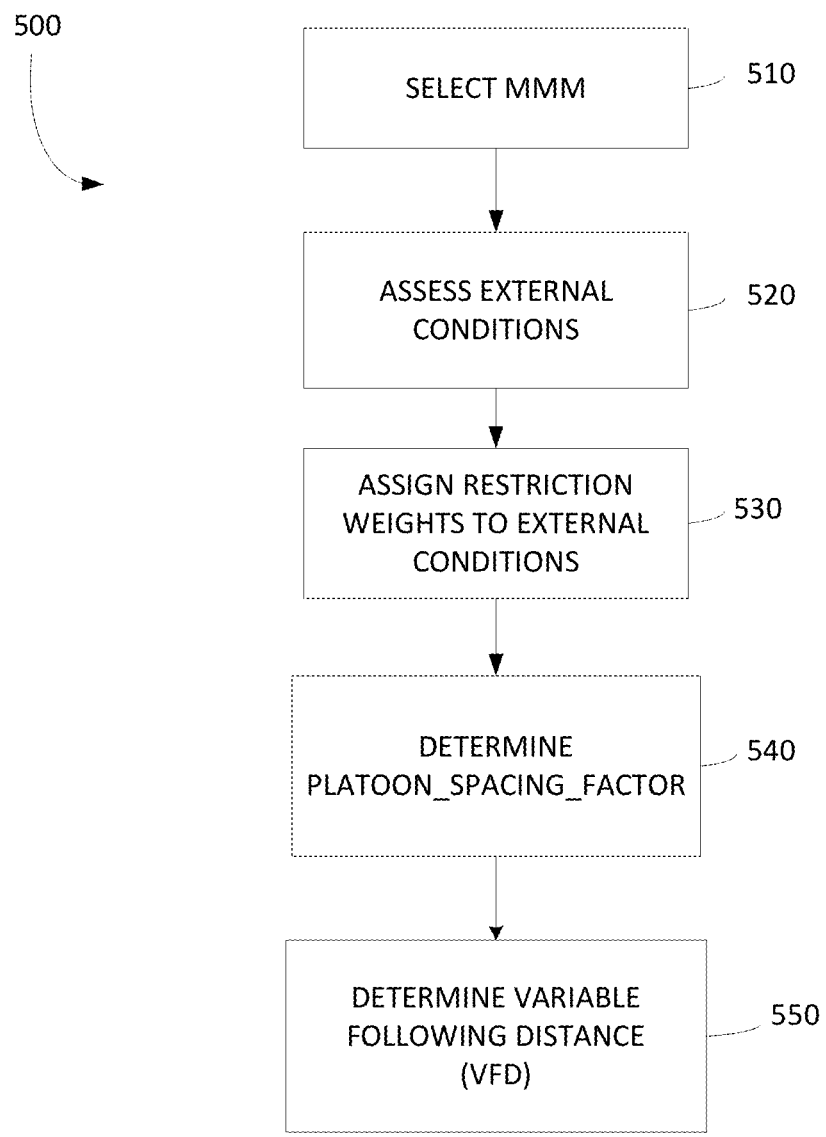
FIG. 5 is a flow diagram showing a control and communication method for management of inter-vehicle platoon distances and/or spacing in accordance with an example embodiment.

With reference next to FIG. 5, a method 500 for management of inter-vehicle platoon distances performed by the electronic system 12 (FIG. 1) of the example and embodiment will be described. As noted above, the electronic control system 12 is provided for communication and control functions. Logic such as software or other forms are executed by the processor of the control system 12 in order to conduct communication functionality, vehicle and driver parameter manipulation, and platoon management including, in the example embodiment, inter-vehicle distance management of fleet vehicles in the platoon. Although the portions of the method 500 are illustrated as functioning serially, it is to be appreciated that the particular serial arrangement is for ease of illustration purposes only, and that the embodiments herein are not limited the exact serial execution, and may be executed in any particular order or in any combination order or in parallel by the control system or an equivalent control system as may be necessary or desired.

In an example, executable instructions associated with performing a method may be embodied as a logic encoded in one or more tangible media for execution. When executed, the instructions may perform a method. Thus, in one example, a logic encoded in one or more tangible media may store computer executable instructions that if executed by a machine (e.g., processor) cause the machine to perform method 500. While executable instructions associated with the above method are described as being embodied as a logic encoded in one or more tangible media, it is to be appreciated that executable instructions associated with other example methods described herein may also be stored on a tangible media.

The control method 500 includes a first step 510 wherein the maximum following distance MMM is selected. In the example embodiment, the maximum following distance MMM is selected by retrieving a predetermined value of the maximum following distance MMM stored in the memory as described above. The value may take on any relative scale, ratio, etc. as may be necessary and/or desired, but in the example embodiment described the value of the maximum following distance MMM is in terms of multiples of a predetermined or otherwise known minimum following distance NNN. As shown for example in FIG. 2b, the maximum following distance MMM is selected to be a multiple of about ten (10) times the minimum following distance NNN. There are various ways of determining the maximum following distance MMM in terms of a multiple of the minimum following distance NNN for any given leader 10 and follower 20 vehicles. For example and as described above, in an example, a typical minimum following spacing for optimized fuel savings is about 0.4 seconds (sec.) or, equivalently, a typical minimum following distance is about 38 feet (ft.) at 65 miles per hour (MPH) for optimized fuel savings. Increasing the following spacing to about 0.8 sec. or, equivalently, the following distance to about 76 feet at 65 MPH eliminates substantially any fuel savings benefit to the lead vehicle of the platoon. Increasing the following spacing further to about 2 sec. or, equivalently, the following distance to about 190 feet at 65 MPH substantially eliminates any fuel savings benefit to both vehicles of a two-vehicle platoon. Therefore, the predetermined or otherwise known minimum following distance NNN might be determined to be about 38 ft. and the maximum following distance MMM might be determined to be about 190 ft. Then the Platoon_Spacing_Factor or ratio is used to adjust or otherwise modify the minimum following distance NNN to provide the variable following distance VFD as: VFD=NNN*(Platoon_Spacing_Factor).

The inter-vehicle platoon distance management method 500 next in step 520 performs an assessment of the various external parameters. As mentioned above, in the example embodiment, the external parameters include but are not limited to: whether there are any one or more lead vehicles ahead of the leader vehicle; whether the vehicles have equal brake capability; whether there is an equal load distribution between vehicles; whether either vehicle has experienced any ABS/ESP activity for a predetermined time; length of time either vehicle has been previously platooning; the overall size of the platoon other than the leader and follower vehicles and/or the number of other traffic participants in general near the platoon; weather condition information such as may be evidenced by windshield wiper activity; whether there are any Regional Restrictions on following distances; and whether there are any fleet restrictions and/or driver preferences.

The inter-vehicle platoon distance management method 500 next in step 530 assigns a restriction weight to each of the various external parameters assessed in step 520. In the example embodiment, preferably, the range of restriction weights assigned to each of the various external parameters corresponds to the Platoon_Spacing_Factor assigned to the maximum following distance parameter MMM. In particular and with regard to the example embodiment, the range of the restrictions weights assigned to each of the various external parameters is from one (1) to ten (10). As will be described in greater detail below, when all of the various external parameters present no restrictions on the inter-vehicle following distance, then their aggregated sum of assigned weights divided by the total number of external parameters results in a Platoon_Spacing_Factor of unity or one (1). As shown in FIG. 2a, the minimum following distance NNN is adjusted or otherwise modified by the Platoon_Spacing_Factor of 1, wherein the VFD calculated is: VFD=NNN*Platoon_Spacing_Factor=NNN*1=NNN. As will further be described in greater detail below, when the various external parameters each individually present a full restriction on the inter-vehicle following distance, then their aggregated sum of assigned weights divided by the total number of external parameters results in a Platoon_Spacing_Factor of ten (10). As shown in FIG. 2b, the maximum following distance MMM is adjusted or otherwise modified by the Platoon_Spacing_Factor of ten (10), wherein the VFD calculated is: VFD=NNN*Platoon_Spacing_Factor=NNN*10. This scaling or normalizing the range of restriction weights ensures that a variable following distance is never assigned beyond what is considered to be a maximum inter-vehicle following distance (10 times NNN in the example embodiment) for any given leader 10 and follower 20 vehicle platooning pair.

The inter-vehicle platoon distance management method 500 next in step 540 determines the Platoon_Spacing_Factor by aggregating the assigned restriction weights and dividing the sum by the total number of external parameters assessed in step 520. It is to be noted that arbitration is selectively performed in the step 540 as may be necessary and/or desired to the largest "Platoon_Spacing_Factor" to get the greatest platooning distance for the current environment.

Lastly, in step 550, the inter-vehicle platoon distance management method 500 determines the variable following distance VFD by multiplying the predetermined minimum following distance NNN by the Platoon_Spacing_Factor. For example, as shown in FIG. 2c, the variable following distance VFD is resolved by multiplying the predetermined minimum following distance NNN by the Platoon_Spacing_Factor of about ten (10) wherein VFD=NNN*Platoon_Spacing_Factor=NNN*10.

Figure 6:
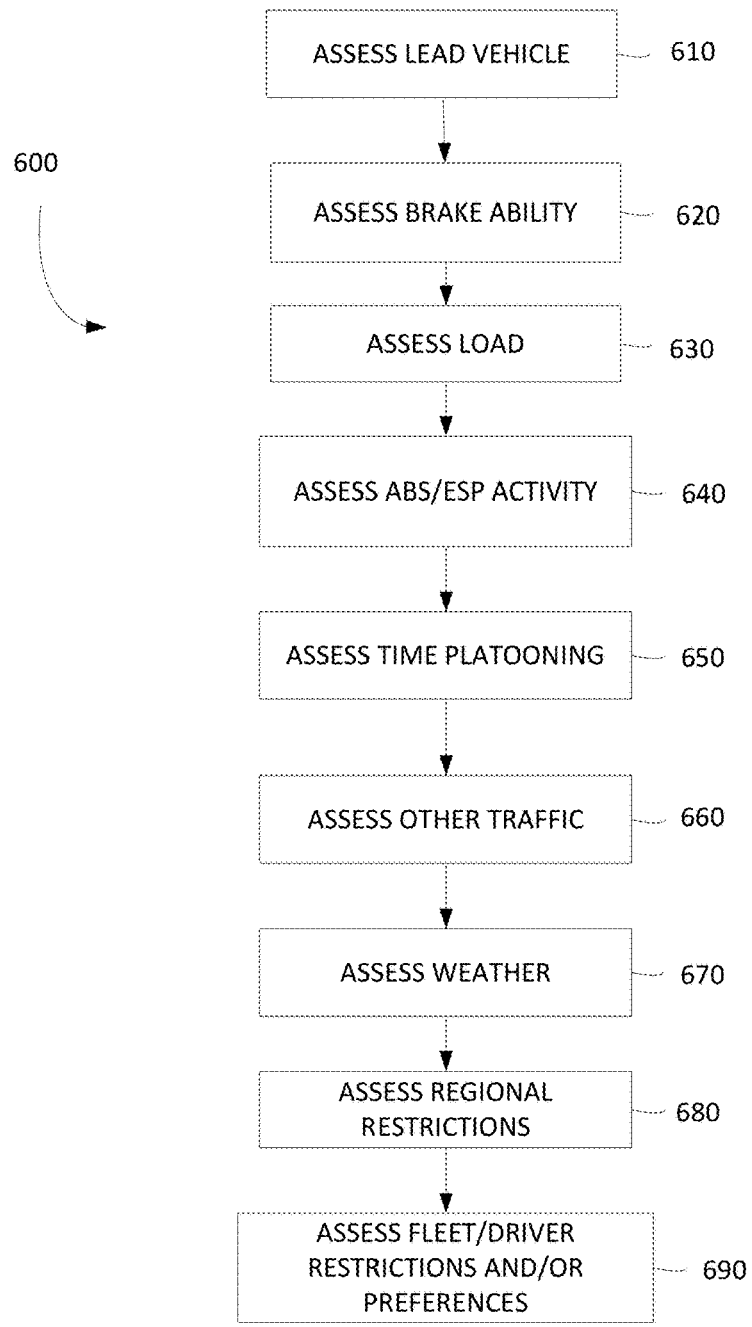
FIG. 6 is a flow diagram showing steps of an environmental condition assessment portion of the inter-vehicle platoon distance/spacing management method of FIG. 5 for inter-vehicle platoon distance management in accordance with an example embodiment.

FIG. 6 is a flow diagram showing assessment steps 600 of an external condition assessment portion 520 of the control and communication method of FIG. 5 for inter-vehicle platoon distance management in accordance with an example embodiment. In step 610, the platoon distance management system resolves the platoon following distance external platoon conditions or restrictions. By way of example, the external conditions may include information on whether there are any one or more lead vehicles ahead of the leader vehicle 10.

At step 620 the platoon distance management system determines whether the vehicles 10, 20 have equal brake capability.

At step 630 the platoon distance management system assesses whether there is an equal load distribution between vehicles.

At step 640 the platoon distance management system assesses whether either vehicle has experienced any ABS/ESP activity for a predetermined time.

At step 650 the platoon distance management system assesses the length of time either vehicle has been previously platooning.

At step 660 the platoon distance management system assesses the overall size of the platoon other than the leader and follower vehicles 10, 20 and/or the number of other traffic participants in general near the platoon A.

At step 670 the platoon distance management system assesses weather information such as may be evidenced by windshield wiper activity, from GPS weather information/alerts, from a Central Command Center (CCC) weather notification, or the like.

At step 680 the platoon distance management system assesses whether there are any Regional Restrictions on following distances.

At step 690 the platoon distance management system assesses whether there are any fleet restrictions and/or driver preferences involved.

Figure 7:
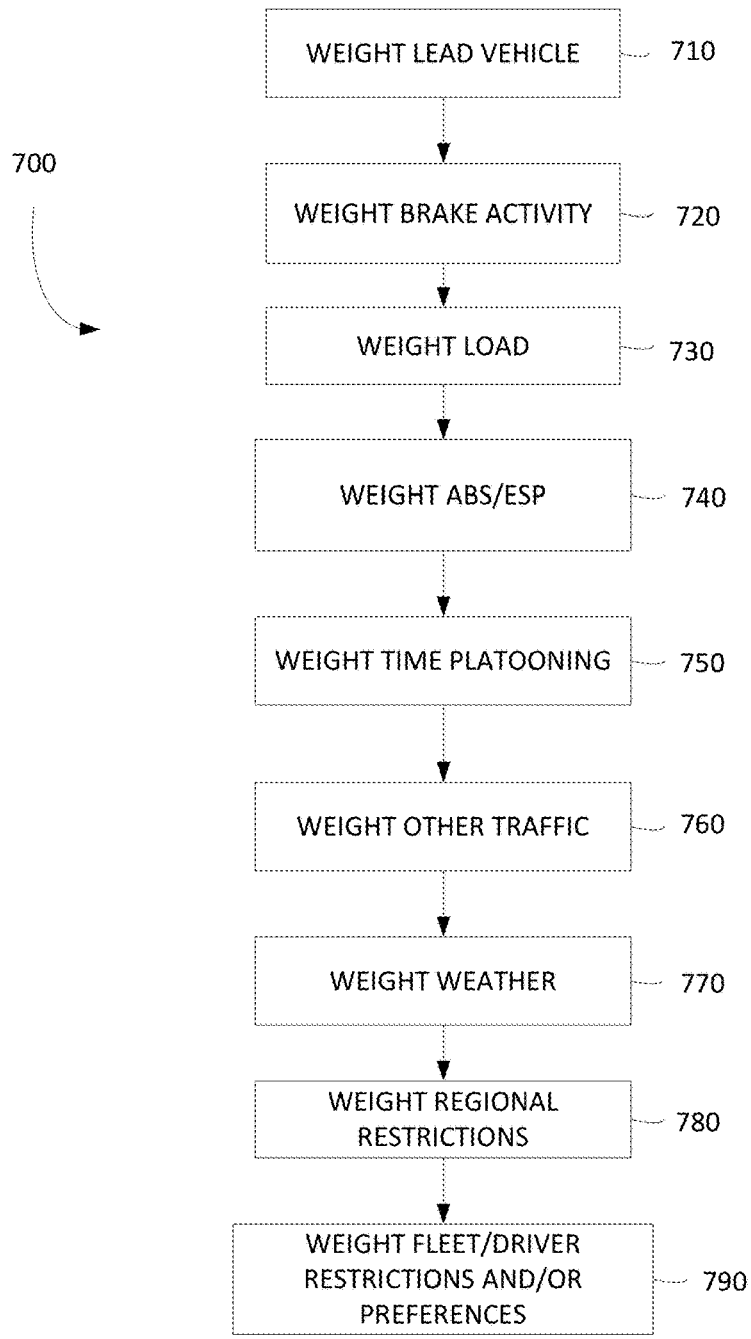
FIG. 7 is a flow diagram showing steps of a restriction weight assignment portion of the inter-vehicle platoon distance/spacing management method of FIG. 5 for inter-vehicle platoon distance management in accordance with an example embodiment.

FIG. 7 is a flow diagram showing restriction weight assignment steps 700 of the restriction weight assignment portion 530 of the control and communication method of FIG. 5 for inter-vehicle platoon distance management in accordance with an example embodiment. In the steps 710-790, the platoon distance management system assigns restriction weights to the predetermined minimum following distance parameter NNN based on the external platoon conditions or restrictions assessed in steps 520 and 610-190. As described above and in accordance with the example embodiment, the platoon distance management system resolves the platoon following distance to be the minimum following distance NNN when there are no observed restrictions relating to the external conditions. By way of example, the platoon following distance is resolved to be the minimum following distance NNN when the external conditions indicate that there are no lead vehicles ahead of the leader vehicle 10, that the vehicles 10, 20 have equal brake capability, that there is an equal load distribution between the vehicles, that neither vehicle has experienced any ABS/ESP activity for a predetermined time, that neither vehicle has been platooning much recently, that there are few other traffic participants, that there is no evidence of inclement weather or wiper activity, and that there are no restrictions on following distance imposed by Regional Restrictions.

On the other hand and in accordance with the example embodiment, the platoon distance management system resolves the platoon following distance to be the maximum following distance MMM when a set of restrictions relating to the external conditions are observed. By way of example, the platoon following distance is resolved to be the maximum following distance MMM when the external conditions indicate that there are one or more lead vehicles ahead of the leader vehicle 10, that the vehicles 10, 20 have unequal brake capability, that there is an unequal load distribution between the vehicles, that one or both of the vehicle has experienced any ABS/ESP activity for a predetermined time, that one or both vehicles have been platooning much recently, that there are many other traffic participants, that there is evidence of inclement weather or wiper activity, and that there are one or more restrictions on following distance imposed by Regional Restrictions.

In step 710, the platoon distance management system assigns restriction weights based on whether there are any one or more lead vehicles ahead of the leader vehicle 10.

At step 720 the platoon distance management system assigns a weight to the determination of whether the vehicles 10, 20 have equal brake capability.

At step 720 the platoon distance management system assigns a weight to the determination of whether there is an equal load distribution between vehicles.

At step 740 the platoon distance management system assesses whether either vehicle has experienced any ABS/ESP activity for a predetermined time.

At step 750 the platoon distance management system assigns a weight to the determination the length of time either vehicle has been previously platooning.

At step 760 the platoon distance management system assigns a weight to the determination of the overall size of the platoon other than the leader and follower vehicles 10, 20 and/or the number of other traffic participants in general near the platoon A.

At step 770 the platoon distance management system assigns a weight to the determination of weather information such as may be evidenced by windshield wiper activity.

At step 780 the platoon distance management system assigns a weight to the determination of whether there are any Regional Restrictions on following distances.

At step 790 the platoon distance management system assigns a weight to the determination of whether there are any fleet restrictions and/or driver preferences involved.

Figure 8:
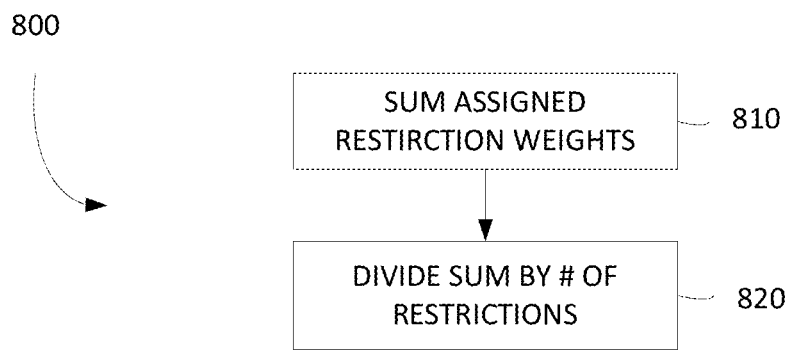
FIG. 8 is a flow diagram showing steps of a Platoon_Spacing_Factor determination portion of the inter-vehicle platoon distance/spacing management method of FIG. 5 for inter-vehicle platoon distance management in accordance with an example embodiment.

FIG. 8 is a flow diagram showing determining steps 800 of the Platoon_Spacing_Factor determination portion 540 of the control and communication method 500 of FIG. 5 for inter-vehicle platoon distance management in accordance with an example embodiment. In step 810 the system sums all of the restriction weights assigned to the external conditions in the steps 710-790. Then, in step 820 the method 800 divides the sum obtained in step 810 by the total number of external conditions being monitored. The result is the Platoon_Spacing_Factor.

Figure 9:
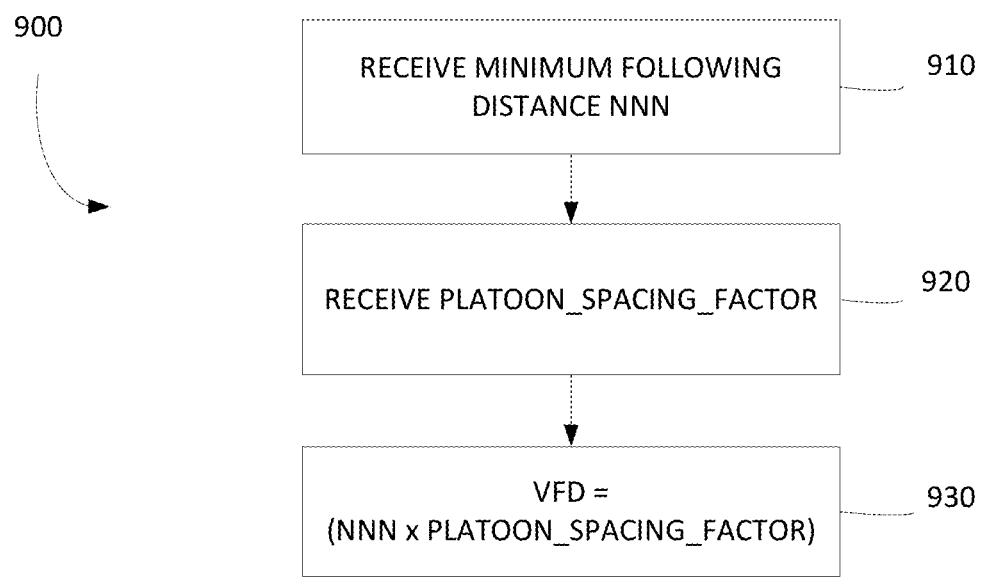
FIG. 9 is a flow diagram showing steps of a variable following distance (VFD) determination portion of the inter-vehicle platoon distance/spacing management method of FIG. 5 for inter-vehicle platoon distance and/or spacing management in accordance with an example embodiment.

FIG. 9 is a flow diagram showing determining steps 900 of the variable following distance (VFD) determination portion 550 of the control and communication method 500 of FIG. 5 for inter-vehicle platoon distance management in accordance with an example embodiment. The minimum following distance NNN is received in step 910. The Platoon_Spacing_Factor is received in step 920. Then, in step 930 the inter-vehicle following distance VFD is determined by multiplying the minimum following distance NNN by the determined Platoon_Spacing_Factor as: VFD=NNN*Platoon_Spacing_Factor.

An example of a variable following distance calculation for a minimum following distance NNN follows below with reference to the Table I and paragraphs thereafter.

TABLE I

| EXTERNAL CONDITION | RESTRICTION WEIGHT |
|---|---|
| Lead Vehicle | 1 |
| Relative Brake Ability | 1 |
| Relative Loads | 1 |
| ABS/ESP Activity | 1 |
| Time Platooning | 1 |
| Other Traffic | 1 |
| Weather Conditions | 1 |
| Regional Restrictions | 1 |
| Fleet/Driver Restrictions and/or Preferences | 1 |

For the above example situation, the summed assigned restriction weights (Step 810) is nine (9), and the sum of the assigned restriction weights divided by the number of restrictions (Step 820) is 9/9=1. Therefore, in this example, the Platoon_Spacing_Factor=1. Then, as set out in Step 930, the VFD=NNN*Platoon_Spacing_Factor=NNN*1=NNN.

As explained above, in the example embodiment, the minimum following distance NNN can be followed when there are no restrictions relative to the external conditions.

On the other hand and as also explained above, the maximum following distance MMM must be followed when there are substantial restrictions relative to the external conditions.

An example of a variable following distance calculation for a maximum following distance MMM follows below with reference to the Table II and paragraphs thereafter.

TABLE II

| EXTERNAL CONDITION | RESTRICTION WEIGHT |
|---|---|
| Lead Vehicle | 10 |
| Relative Brake Ability | 10 |
| Relative Loads | 10 |
| ABS/ESP Activity | 10 |
| Time Platooning | 10 |
| Other Traffic | 10 |
| Weather Conditions | 10 |
| Regional Restrictions | 10 |
| Fleet/Driver Restrictions and/or Preferences | 10 |

For the above example situation, the summed assigned restriction weights (Step 810) is 117, and the sum of the assigned restriction weights divided by the number of restrictions (Step 820) is 90/9=10. Therefore, in this example, the Platoon_Spacing_Factor=10. Then, as set out in Step 930, the VFD=NNN*Platoon_Spacing_Factor=NNN*10=MMM.

As further explained above, in the example embodiment, a beneficial variable following distance VFD between the minimum NNN following distance and the maximum following distance MMM can be followed when there are some restrictions relative to the external conditions.

A further example of a variable following distance calculation for a variable following distance VFD follows below with reference to the Table III and paragraphs thereafter.

TABLE III

| EXTERNAL CONDITION | RESTRICTION WEIGHT |
|---|---|
| Lead Vehicle | 8 |
| Relative Brake Ability | 6 |

TABLE III-continued

| EXTERNAL CONDITION | RESTRICTION WEIGHT |
|---|---|
| Relative Loads | 5 |
| ABS/ESP Activity | 5 |
| Time Platooning | 5 |
| Other Traffic | 8 |
| Weather Conditions | 5 |
| Regional Restrictions | 7 |
| Fleet/Driver Restrictions and/or Preferences | 5 |

For the above example situation, the summed assigned restriction weights (Step 810) is 54, and the sum of the assigned restriction weights divided by the number of restrictions (Step 820) is 54/9=6. Therefore, in this example, the Platoon_Spacing_Factor=6. Then, as set out in Step 930, the VFD=NNN*Platoon_Spacing_Factor=NNN*6=VFD.

A still further example of a variable following distance calculation for a variable following distance VFD follows below with reference to the Table IV and paragraphs thereafter.

TABLE IV

| EXTERNAL CONDITION | RESTRICTION WEIGHT |
|---|---|
| Lead Vehicle | 8 |
| Relative Brake Ability | 6 |
| Relative Loads | 5 |
| ABS/ESP Activity | 5 |
| Time Platooning | 5 |
| Other Traffic | 7 |
| Weather Conditions | 5 |
| Regional Restrictions | 7 |
| Fleet/Driver Restrictions and/or Preferences | 5 |

For the above example situation, the method 800 shown in FIG. 8 is replaced with a Maximum function wherein the Platooning_Spacing_Factor is determined in accordance with MAX(assigned restriction weights). Therefore, in this example, the Lead Vehicle external condition has a restriction weight of 8 and the other external conditions have restrictions weights less than 8. Accordingly, the restriction weight of 8 is the maximum restriction weights of the set thereof. According to this embodiment then, MAX(assigned restriction weights).=8=Platoon_Spacing_Factor. Then, as set out in Step 930, the VFD=NNN*Platoon_Spacing_Factor=NNN*8=VFD.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A method of determining an inter-vehicle following distance of a platooning vehicle pair including an associated leading vehicle and an associated following vehicle cooperatively travelling as a platoon, the method comprising:
providing a platoon control unit in the associated following vehicle, the platoon control unit comprising a processor, a non-transient memory operatively coupled with the processor, and logic stored in the non-transient memory and executable by the processor to determine a variable inter-vehicle following distance;
  determining by the processor of the platoon control unit an inter-vehicle minimum following distance;
  determining by the processor of the platoon control unit an inter-vehicle maximum following distance;
  determining by the processor of the platoon control unit a multiplier, wherein the inter-vehicle maximum following distance is a product of the multiplier and the inter-vehicle minimum following distance;
  assessing by the processor of the platoon control unit a set of variable condition data relative to the associated following vehicle of the platooning vehicle pair;
  assigning by the processor of the platoon control unit a following distance restriction weight to each of the set of variable condition data as a set of weighted condition data, wherein each following distance restriction weight assigned to each of the set of variable condition data is between unity and the multiplier thereby normalizing the set of weighted condition data to the multiplier;
  determining by the processor of the platoon control unit a platoon spacing factor based on the set of weighted condition data; and
  determining by the processor of the platoon control unit the variable inter-vehicle following distance as a product of the platoon spacing factor and the inter-vehicle minimum following distance.

2. The method of determining an inter-vehicle following distance of a platooning vehicle pair according to claim 1, wherein:
  the assessing the set of variable condition data relative to the associated following vehicle of the platooning vehicle pair comprises assessing by the processor of the platoon control unit one or more of:
    a presence of one or more lead vehicles ahead of the associated leading vehicle of the platooning vehicle pair;
    a relative brake capability between the associated leading and following vehicles of the platooning vehicle pair;
    a relative load distribution between the associated leading and following vehicles of the platooning vehicle pair;
    an ABS/ESP activity for a predetermined time;
    a length of time either vehicle has been previously platooning;
    an overall size of the platoon other than the leader and follower vehicles and/or the number of other traffic participants in general near the platoon;
    a weather condition evidenced by windshield wiper activity;
    a Regional Restrictions on following distances; and/or
    a fleet restriction and/or driver preference.

3. The method of determining an inter-vehicle following distance of a platooning vehicle pair according to claim 2, wherein:
  the determining by the processor the inter-vehicle minimum following distance comprises retrieving the inter-vehicle minimum following distance from the non-transient memory of the platoon control unit; and
  the determining by the processor the inter-vehicle maximum following distance comprises retrieving the inter-vehicle maximum following distance from the non-transient memory of the platoon control unit.

4. The method of determining an inter-vehicle following distance of a platooning vehicle pair according to claim 1, further comprising:
  selectively generating by the processor of the platoon control unit a platoon discontinue signal in accordance with a magnitude of the determined platoon spacing factor relative to a predetermined threshold value stored in the non-transient memory of the platoon control, the platoon discontinue signal being used by the associated following vehicle to manage the platoon by selectively discontinuing participation by the associated following vehicle in the platoon responsive to the associated following vehicle receiving the platoon discontinue signal from the platoon control unit.

5. The method of determining an inter-vehicle following distance of a platooning vehicle pair according to claim 1, wherein the determining platoon spacing factor comprises:
  determining platoon spacing factor as an average of the set of weighted condition data.

6. The method of determining an inter-vehicle following distance of a platooning vehicle pair according to claim 5, wherein:
  the determining the platoon spacing factor as the average of the set of weighted condition data comprises aggregating the set of weighted condition data as a sum of weighted condition data and dividing the sum of weighted condition data by a total number of the set of variable condition data relative to the associated following vehicle of the platooning vehicle pair.

7. A system for determining an inter-vehicle following distance of a platooning vehicle pair including an associated leading vehicle and an associated following vehicle cooperatively travelling as a platoon, the system comprising:
  a platoon control unit configured to be disposed in the associated following vehicle, the platoon control unit comprising:
    a processor;
    a non-transient memory operatively coupled with the processor; and
    logic stored in the non-transient memory and executable by the processor to determine a variable inter-vehicle following distance by:
      determining an inter-vehicle minimum following distance;
      determining an inter-vehicle maximum following distance;
      determining a multiplier, wherein the inter-vehicle maximum following distance is a product of the multiplier and the inter-vehicle minimum following distance;
      assessing a set of variable condition data relative to the associated following vehicle of the platooning vehicle pair;
      assigning a following distance restriction weight to each of the set of variable condition data as a set of weighted condition data, wherein each following distance restriction weight assigned to each of the set of variable condition data is between unity and the multiplier thereby normalizing the set of weighted condition data to the multiplier;
      determining a platoon spacing factor based on the set of weighted condition data; and
      determining the variable inter-vehicle following distance as a product of the platoon spacing factor applied to the inter-vehicle minimum following distance.

8. The system according to claim 7, wherein:
the platoon control unit is operable to assess the set of variable condition data relative to the associated following vehicle of the platooning vehicle pair by assessing one or more of:
- a presence of one or more lead vehicles ahead of the associated leading vehicle of the platooning vehicle pair;
- a relative brake capability between the associated leading and following vehicles of the platooning vehicle pair;
- a relative load distribution between the associated leading and following vehicles of the platooning vehicle pair;
- an ABS/ESP activity for a predetermined time;
- a length of time either vehicle has been previously platooning;
- an overall size of the platoon other than the leader and follower vehicles and/or the number of other traffic participants in general near the platoon;
- a weather condition evidenced by windshield wiper activity;
- a Regional Restrictions on following distances; and/or
- a fleet restriction and/or driver preference.

9. The system according to claim 8, wherein the control unit is operable to:
- determine the inter-vehicle minimum following distance by retrieving the inter-vehicle minimum following distance from the non-transient memory of the platoon control unit; and
- determine the inter-vehicle maximum following distance by retrieving the inter-vehicle maximum following distance from the non-transient memory of the platoon control unit.

10. The system according to claim 7, wherein the control unit is operable to:
- selectively generate a platoon discontinue signal in accordance with a magnitude of the determined platoon spacing factor relative to a predetermined threshold value stored in the non-transient memory of the platoon control, the platoon discontinue signal being used by the associated following vehicle to manage the platoon by selectively discontinuing participation by the associated following vehicle in the platoon responsive to the associated following vehicle receiving the platoon discontinue signal from the platoon control unit.

11. The system according to claim 7, wherein the logic stored in the non-transient memory is executable by the processor to determine the platoon spacing factor as an average of the set of weighted condition data.

12. The system according to claim 11, wherein:
the control unit is operable to determining the platoon spacing factor as the average of the set of weighted condition data by aggregating the set of weighted condition data as a sum of weighted condition data and dividing the sum of weighted condition data by a total number of the set of variable condition data relative to the associated following vehicle of the platooning vehicle pair.

13. A non-transitory machine readable storage medium having instructions thereon that when executed cause an associated platoon control unit including a processor to perform steps for determining an inter-vehicle following distance of a platooning vehicle pair including an associated leading vehicle and an associated following vehicle cooperatively travelling as a platoon, the steps comprising:
- determining by the processor of the associated platoon control unit an inter-vehicle minimum following distance;
- determining by the processor of the associated platoon control unit an inter-vehicle maximum following distance;
- determining by the processor of the associated platoon control unit a multiplier, wherein the inter-vehicle maximum following distance is a product of the multiplier and the inter-vehicle minimum following distance;
- assessing by the processor of the associated platoon control unit a set of variable condition data relative to the associated following vehicle of the platooning vehicle pair;
- assigning by the processor of the associated platoon control unit a following distance restriction weight to each of the set of variable condition data as a set of weighted condition data, wherein each following distance restriction weight assigned to each of the set of variable condition data is between unity and the multiplier thereby normalizing the set of weighted condition data to the multiplier;
- determining by the processor of the associated platoon control unit a platoon spacing factor based on the set of weighted condition data; and
- determining by the processor of the associated platoon control unit the variable inter-vehicle following distance as a product of the platoon spacing factor applied to the inter-vehicle minimum following distance.

14. The non-transitory machine readable storage medium according to claim 13, wherein:
the assessing the set of variable condition data relative to the associated following vehicle of the platooning vehicle pair comprises assessing by the processor of the platoon control unit one or more of:
- a presence of one or more lead vehicles ahead of the associated leading vehicle of the platooning vehicle pair;
- a relative brake capability between the associated leading and following vehicles of the platooning vehicle pair;
- a relative load distribution between the associated leading and following vehicles of the platooning vehicle pair;
- an ABS/ESP activity for a predetermined time;
- a length of time either vehicle has been previously platooning;
- an overall size of the platoon other than the leader and follower vehicles and/or the number of other traffic participants in general near the platoon;
- a weather condition evidenced by windshield wiper activity;
- a Regional Restrictions on following distances;
- a fleet restriction and/or driver preference.

15. The non-transitory machine readable storage medium according to claim 14, wherein:
- the determining by the processor the inter-vehicle minimum following distance comprises retrieving the inter-vehicle minimum following distance from the non-transient memory of the platoon control unit; and
- the determining by the processor the inter-vehicle maximum following distance comprises retrieving the inter-vehicle maximum following distance from the non-transient memory of the platoon control unit.

16. The non-transitory machine readable storage medium according to claim 13, further comprising:

selectively generating by the processor of the platoon control unit a platoon discontinue signal in accordance with a magnitude of the determined platoon spacing factor relative to a predetermined threshold value stored in the non-transient memory of the platoon control, the platoon discontinue signal being used by the associated following vehicle to manage the platoon by selectively discontinuing participation by the associated following vehicle in the platoon responsive to the associated following vehicle receiving the platoon discontinue signal from the platoon control unit.

17. The non-transitory machine readable storage medium according to claim 13, wherein the determining the platoon spacing factor comprises:

determining by the processor of the associated platoon control unit the platoon spacing factor as an average of the set of weighted condition data.

18. The non-transitory machine readable storage medium according to claim 17, wherein:

the determining the platoon spacing factor as the average of the set of weighted condition data comprises aggregating the set of weighted condition data as a sum of weighted condition data and dividing the sum of weighted condition data by a total number of the set of variable condition data relative to the associated following vehicle of the platooning vehicle pair.

* * * * *